United States Patent [19]
Ando

[11] 3,883,252
[45] May 13, 1975

[54] EXPOSURE METER DEVICE

[75] Inventor: Hirokazu Ando, Tokyo, Japan

[73] Assignee: Asahi Kogaku Kogyo Kabushiki Kaisha, Tokyo, Japan

[22] Filed: Aug. 28, 1973

[21] Appl. No.: 392,231

[30] Foreign Application Priority Data
Aug. 29, 1972 Japan.............................. 47-100836

[52] U.S. Cl. ................ 356/227; 356/218; 356/226
[51] Int. Cl. ............................................... G01j 1/42
[58] Field of Search ........... 356/218, 224, 225, 226, 356/227

[56] References Cited
UNITED STATES PATENTS
3,724,955 4/1973 Takahashi et al................... 356/227

*Primary Examiner*—Ronald L. Wibert
*Assistant Examiner*—F. L. Evans
*Attorney, Agent, or Firm*—Christie, Parker & Hale

[57] ABSTRACT

An exposure meter device indicates which exposure range out of preferably five different indicatable exposure ranges has been selected as the one into which an exposure amount has been regulated. A plurality, preferably three, electrically energizable illuminative elements provide for displaying a visual indication of the selected exposure range. Photosensitive transducing means and circuit means responsive thereto provide for energizing the illuminative elements and are operative to cause at least one of the elements to flicker as an indication of one exposure range and to be continuously illuminated as an indication of another exposure range.

4 Claims, 12 Drawing Figures

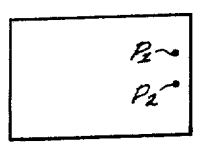
Fig - 1A
PRIOR ART
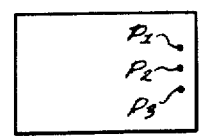
Fig - 1B
PRIOR ART
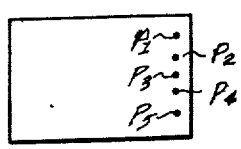
Fig - 1C
PRIOR ART
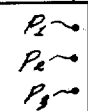
Fig - 2
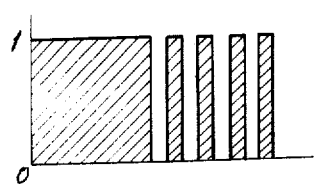
Fig - 3A₁
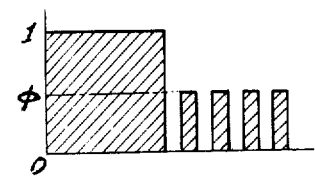
Fig - 3A₂
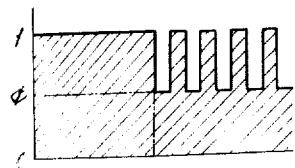
Fig - 3B₁
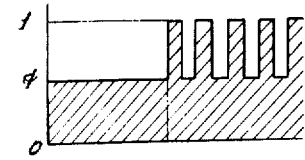
Fig - 3B₂ ns to exposure meter devices. Exposure meter devices are advantageously built into cameras to provide the photographer with an indication of whether he has adjusted the aperture setting and shutter speed appropriately. Among the devices that have been proposed are those which include two or more electrically energizable illuminative elements to display measurement results. Advantageously, as schematically illustrated in FIGS. 1A to 1C, the elements can be longitudinally or transversely arranged for viewing through the viewfinder of the camera. At a minimum of course, the photographer desires an indication of whether he has, through setting of aperture and shutter speed controls, regulated the exposure amount to fall within or without a normally optimum exposure range. In one approach, as illustrated in FIG. 1A, this minimum indication can be displayed alternatively by illuminating one or the other of two elements P1 and P2. With this approach, the photographer knows only whether the exposure amount is in or out of the normally optimum range, but if it is out, he does not know whether it is out on the side of overexposure or the side of underexposure. In the approach illustrated in FIG. 1B, there are provided three elements P1, P2, and P3, with illumination of different ones of the elements indicating respectively underexposure, normally optimum exposure, and overexposure conditions. This approach also fails to provide information of significance to the photographer. That is, for particular photographic effects, it is sometimes desirable to expose the film with slightly more or slightly less than the normally optimum amount. This might be desirable, for example, to emphasize highlights or to bring out the details of a backlighted subject. To meet this more sophisticated requirement, it has been proposed, as illustrated in FIG. 1C, to provide five elements P1 through P5. With this approach, illumination of different ones of the five elements respectively indicate gross underexposure, slight underexposure, normally optimum exposure, slight overexposure, and gross overexposure conditions. This approach, however, suffers from the disadvantage that the viewfinder is crowded with so many elements and further that the photographer is easily confused by them.

EXPOSURE METER DEVICE

BACKGROUND OF THE INVENTION

This invention relates to exposure meter devices. Exposure meter devices are advantageously built into cameras to provide the photographer with an indication of whether he has adjusted the aperture setting and shutter speed appropriately. Among the devices that have been proposed are those which include two or more electrically energizable illuminative elements to display measurement results. Advantageously, as schematically illustrated in FIGS. 1A to 1C, the elements can be longitudinally or transversely arranged for viewing through the viewfinder of the camera. At a minimum of course, the photographer desires an indication of whether he has, through setting of aperture and shutter speed controls, regulated the exposure amount to fall within or without a normally optimum exposure range. In one approach, as illustrated in FIG. 1A, this minimum indication can be displayed alternatively by illuminating one or the other of two elements P1 and P2. With this approach, the photographer knows only whether the exposure amount is in or out of the normally optimum range, but if it is out, he does not know whether it is out on the side of overexposure or the side of underexposure. In the approach illustrated in FIG. 1B, there are provided three elements P1, P2, and P3, with illumination of different ones of the elements indicating respectively underexposure, normally optimum exposure, and overexposure conditions. This approach also fails to provide information of significance to the photographer. That is, for particular photographic effects, it is sometimes desirable to expose the film with slightly more or slightly less than the normally optimum amount. This might be desirable, for example, to emphasize highlights or to bring out the details of a backlighted subject. To meet this more sophisticated requirement, it has been proposed, as illustrated in FIG. 1C, to provide five elements P1 through P5. With this approach, illumination of different ones of the five elements respectively indicate gross underexposure, slight underexposure, normally optimum exposure, slight overexposure, and gross overexposure conditions. This approach, however, suffers from the disadvantage that the viewfinder is crowded with so many elements and further that the photographer is easily confused by them.

SUMMARY OF THE INVENTION

This invention is directed to providing the advantage of displaying to the photographer the significant information as to exposure amount without suffering from the cumbersome disadvantages of a crowded and overly complicated viewfinder. To this end, this invention embodies the concept of distinguishing between different exposure ranges by selecting between continuous or flickering illumination of an illuminative device.

An embodiment of this invention comprises a plurality of electrically energizable illuminative elements for displaying a visual indication of a selected exposure range. Preferably, the device provides distinguishable indications of five separate exposure ranges and yet requires only three elements. To this end, in one distinguishable indication a selected one of the elements is illuminated continuously and in another distinguishable indication this same element flashes. The device further includes photosensitive transducing means for providing an electrical signal indicative of a regulated exposure amount. The electrical signal varies relative to a plurality of threshold values that define a plurality of electrical signal ranges, each of which corresponds to a different one of the exposure ranges. Circuit means are coupled to receive the electrical signal. In response to the electrical signal's value relative to the threshold values, the circuit means provide for selectively energizing the illuminative elements. Preferably, the circuit means includes a first circuit having a first plurality of output terminals, each terminal of which is connected to a separate one of the illuminative elements. The elements are arranged in parallel circuit relationship and the first circuit operates to connect any one of the elements into a series circuit current flow path. Switching means in the current flow path are controllable by the first circuit either to Maintain a steady current flow or to cause pulsating current flow and thereby cause either continuous or flickering illumination of the selected element.

BRIEF DESCRIPTION OF THE DRAWINGS

FIGS. 1A, 1B, and 1C schematically show indicator systems proposed in the prior art;

FIG. 2 schematically shows by way of example an indicator system according to the present invention;

Figure 4:
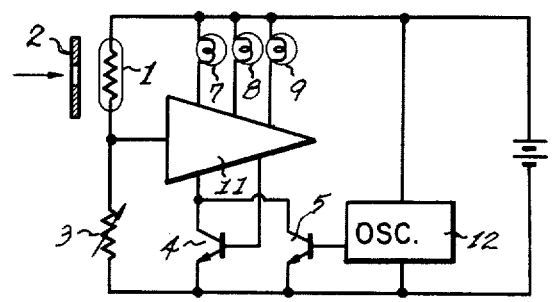
Figure 5:
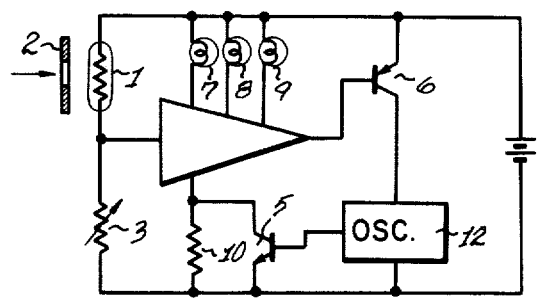
Figure 6A:
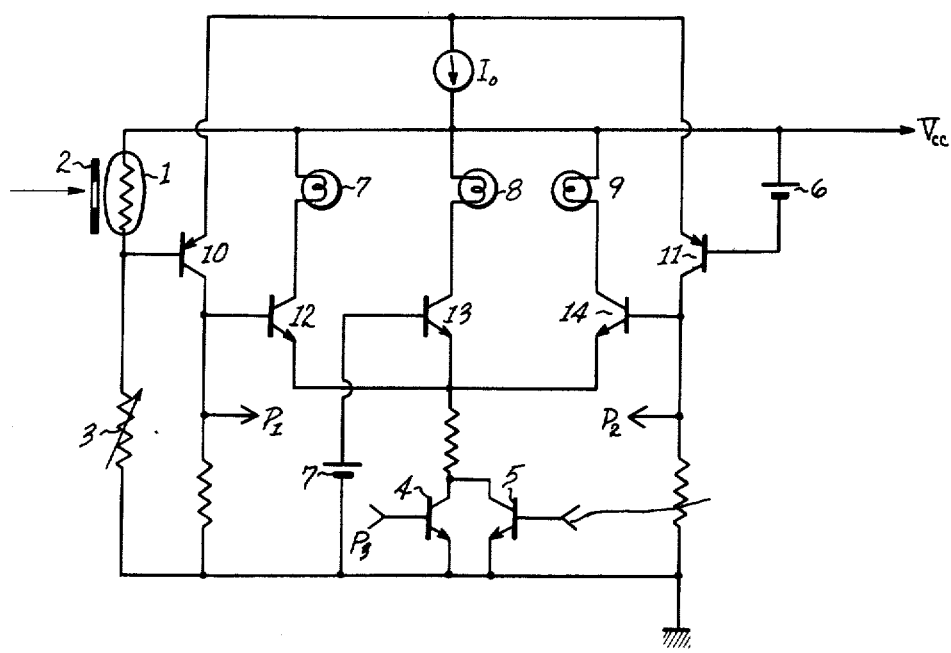
Figure 6B:
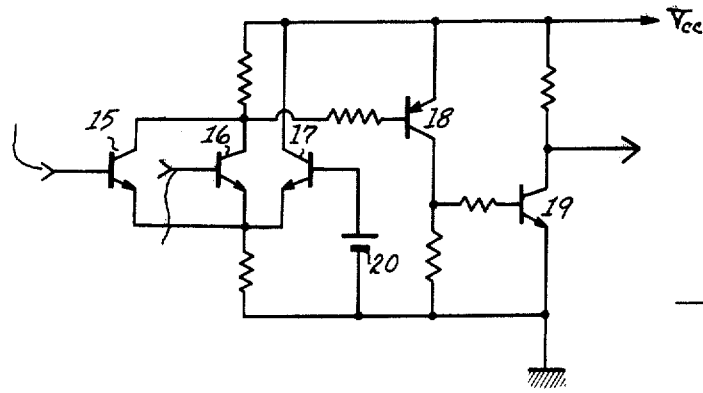

FIGS. $3A_1$, $3A_2$, $3B_1$ and $3B_2$ are charts each illustrating a particular mode of operation;

FIG. 4 is a circuit and block diagram showing one embodiment of the present invention;

FIG. 5 is a circuit and block diagram, showing an alternative embodiment of the present invention; and FIGS. 6A and 6B are schematics showing details of an operational circuit.

DETAILED DESCRIPTION OF THE INVENTION

As indicated schematically in FIG. 2, there are preferably in accordance with this invention provided three separately electrically energizable illuminative elements, P1, P2, and P3 that are arranged for viewing through the viewfinder of a camera (not shown). The elements provide for displaying a visual indication of a selected exposure range. That is, an exposure mount can be regulated by shutter speed and aperture stop controls for example, to fall within any one of five exposure ranges. Advantageously, these exposure ranges are: gross or substantial underexposure; slight underexposure; normally optimum exposure; slight overexposure; and gross or substantial overexposure. In operation, when the exposure amount has been regulated to fall within the normally optimum exposure range, preferably element P2 is energized by means discussed hereinafter so that it is continuously illuminated. When the exposure amount falls outside the normally optimum range but its excess or deficiency is less than a predetermined amount, either element P1 or P2 is energized to cause it to be continuously illuminated. Significantly, when its excess or deficiency exceeds the predetermined amount, either element P1 or P2 is caused to flicker. This approach provides the advantage that with the use of relatively few illuminative elements, much information is imparted to the photographer without confusing him or occupying so much space in a viewfinder. It should be noted for example that in comparison with the prior approach illustrated by FIG. 1C, that the approach of this invention provides as much information and yet requires fewer elements. Also to be noted as to the scope of this invention is the fact that irrespective of how much information is desired, fewer elements are required with this invention to impart a given amount of information than are required in accordance with the prior art teachings.

Various modes of operation of alternative embodiments of this invention are represented in the charts, provided in the drawings. In these charts, a state in which an illuminative element is continuously illuminated is represented by logical 1. An opposite state wherein the illuminative element is not illuminated is represented by a logical 0. The symbol $\phi$ represents an intermediate state in which the element is illuminated but not so brightly as it is in state 1.

In FIG. 4, there is shown a diaphragm mechanism 2 having an aperture through which light passes to impinge upon a photo cell 1, preferably of the CdS type. The photo cell 1 is serially connected with a variable resistance 3 to form a node that is connected to the input of an operational circuit 11. Circuit 11 and the mechanism by which the resistance of variable resistance 3 is controlled are conventional in the art. Typically, in a camera having a built-in light meter, there is provided a mechanism by which a variable resistance such as that shown is adjusted in accordance with such settings as film speed, shutter speed, and aperture setting. Also in conventional manner there is generated at the input to operational circuit 11 an electrical signal having a value that varies relative to a plurality of threshold values that define a plurality of electrical signal ranges, each of which corresponds to a different one of the exposure ranges.

The circuit 11 has a plurality of output terminals. Each of a first plurality of them is connected to a separate one of a plurality of the electrically energizable illuminative elements 7, 8, and 9. The elements 7, 8, and 9 are arranged in parallel circuit relationship with respect to each other, and each is selectively connectible on a one-at-a-time basis through the operation of circuit 11 into a current flow path. The operation of circuit 11 in this respect is the same as corresponding circuits conventionally provided in prior art approaches such as that of FIG. 1B. That is, when the electrical signal is in an electrical signal range such that there is electrically indicated the fact that the exposure of mount has been regulated to fall within normally optimum exposure range, element 8 is selected for connection into the electric current flow path. When the signal is indicative of an underexposure condition, whether a slight or substantial one, element 7 is selected. When the electrical signal is indicative of an overexposure condition, whether a slight or substantial one, element 9 is selected.

In accordance with this invention, switching means are provided in the current flow path and are controllable by circuit 11 either to maintain a steady current flow or to cause pulsations in the current flow. In the embodiment of FIG. 4, transistors 4 and 5, while being connected in parallel relationship with respect to each other, are each connected in series circuit relationship with respect to circuit 11 and are thereby within the current flow path. Transistor 4 has its base electrode connected to an output of circuit 11 for control thereby. This output of circuit 11, in response to the electrical signal input, either drives transistor 4 into conduction as when normally optimum or slightly different from optimum exposure conditions are indicated, or turns off transistor 4 as when electrical signal differs from optimum value by predetermined amount indicating either gross underexposure or gross overexposure conditions. It should be noted that in this respect the operation of circuit 11 corresponds to prior art circuits provided in the approach illustrated by FIG. 1C. That is, the corresponding circuit in that prior art approach provides for signals to identify when fourth or fifth elements are to be energized. In accordance with this invention, instead of using such identifying signals to select extra elements, the signals are used for controlling switching means.

FIG. 4 also shows in block diagram form a conventional relaxation oscillator 12. The output of oscillator 12 continuously drives transistor 5 into and out of conduction on a cyclical basis. The effect of the turning on and turning off transistor 5 depends upon whether or not transistor 4 is in conduction. When transistor 4 conducts, the turning on and off has no effect. That is, there is a current flow path from the battery, through the selected one of the elements 7, 8, or 9, the circuit 11, transistor 4, and back to the battery. This is true regardless of whether transistor 5 is on or off. Thus with continuous current flowing through it, the selected element is continuously illuminated.

On the other hand, when transistor 4 is turned off, the current flow path is cyclically interrupted thereby causing pulsing of the current flow. This results in flickering of the selected element. Referring again to FIG. $3A_1$, it should be noted that when transistor 4 is turned on, the 1 state is achieved, whereas when transistor 4 is turned off there is an oscillation back and forth between the 1 state and the 0 state.

In the alternative embodiment of FIG. 5, the switching means and the current flow path comprise resistor 10 and transistor 5 which are connected in parallel circuit relationship with respect to each other. The control output of circuit 11 is connected to control transistor 6 which in turn controls oscillator 12. With this arrangement, oscillator 12 is turned on only when substantial over- or underexposure conditions exist. When oscillator 12 is off, transistor 5 does not conduct. The value of resistance 10 of course affects the amount of current when transistor 5 is not conducting. For example, as illustrated by FIG. $3B_2$, the value resistor 10 can be such that state $\phi$ is achieved when transistor 5 is off. Then, when transistor 5 switches back and forth into and out of conduction, it causes pulsing between states 1 and $\phi$. Preferably, whenever the exposure amount differs by less than a predetermined value, the oscillator 12, presents a steady drive to hold transistor 5 in conduction. Then, when the exposure amount exceeds this predetermined value, the oscillator 12 cyclically drives transistor 5 into and out of conduction. This manner of operation is illustrated in FIGS. $3B_1$ and $3B_2$ which differ with respect to whether transistor 5 conducts when transistor 6 is turned off. An example of the circuit 11 and its operation will now be described with reference to FIGS. 6A and 6B.

In the case that exposure is normally optimum:

$V_{B10}$ (base voltage of the transistor 10) is equal to $V_{B11}$ (base voltage of the transistor 11 = voltage of the standard battery 6). Then $V_{B12}$ is naturally equal to $V_{B14}$ (base voltage of the transistor 12 and the transistor 14 = $V_{B15}$, $V_{B16}$). Accordingly, under the conditions such as $V_{B12} = V_{B14} < V_{B13}$ (base voltage of the transistor 13 = voltage of the standard battery 7) and $V_{B12}$ = $V_{B14} < V_{B17}$ (base voltage of the transistor 17 = voltage of the standard battery 20), the transistor 4 is turned on, and the illuminative element 8 is normally lit to indicate that the exposure is proper.

In the cases that over-exposure or under-exposure do not exceed a certain value:

In the conduction of $V_{B10} < V_{B11}$, and further $V_{B17} \geq V_{B12} \geq V_{B13}$, the condition of $V_{B17} \geq V_{B12}$ makes the transistor 4 turn on, and the condition $V_{B12} \geq V_{B13}$ makes the illuminative element 7 or both of the illuminative elements 7 and 8 normally light. Hence, over-exposure or under-exposure within a certain value can be indicated. In the condition of $V_{B10} > V_{B11}$, the same performance is carried out.

In the cases that over-exposure or under-exposure exceed a certain value:

In the condition of $V_{B10} \ll V_{B11}$ (or $V_{B10} \ll V_{B11}$) and further $V_{B12} < V_B17$, the transistors 18, 19 turn on. Consequently, the transistor 4 turns off. Since the transistor 5 turns on and turns off in accordance with cycle of oscillation caused by the relaxation oscillator circuit, the illuminative element 7 or 9 lights on or turns off to indicate that over-exposure or under-exposure exceeds a certain value.

It should be noted as to the embodiment of FIG. 4 that there may be provided other modes of indication. That is, if desired the condition of continuous lighting can be intermediate the 1 and 0 states. This mode is achievable by including additional resistors, for example by connecting a resistor in series with the transistors in the switching means. FIGS. $3A_2$ and $3B_2$ illustrate such operation.

According to the present invention, it will be obviously understood from the aforegoing description that a plurality of electrically energizable elements are controllable by processing obtained from photosensitive means and circuit means responsive thereto. The photosensitive means preferably include a CdS photocell and the variable resistor 3 so that an electrical signal is generated based on photographic factors such as the light intensity of an object to be photographed, and the like. The circuit means provides for selectively energizing the elements so that one is steadily lit when said result of processing is optimal or negligibly excessive or deficient as an exposure amount and so that one flickers under control of the output from a relaxation oscillator circuit when said excess or deficiency goes beyond the predetermined value. Thus, there is provided a further distinguishable indication in addition to the convention ones of lighting the elements and putting them out, and thereby the distinguishable indications may be effectively increased with a relatively few elements. This further manner of indication by flickering of the elements effectively indicates excess or deficiency of exposure beyond the predetermined value and calls attention of the user in more reliable manner than in the exposure meter devices of the prior art.

What is claimed is:

1. An exposure meter device for indicating which one of a plurality of exposure ranges has been selected as the one into which an exposure amount has been regulated, which comprises:

a plurality of electrically energizable illuminative elements for displaying a visual indication of the selected exposure range, at least a first one of the elements being exclusively pre-assigned to indicate a pair of exposure ranges that differ slightly and grossly respectively from a normally optimum exposure range, one of the pair being indicated by flickering of the first element, the other of the pair being indicated by continuous illumination of the first element;

photosensitive transducing means for providing an electrical signal indicative of the regulated exposure amount, electrical signal varying relative to a plurality of threshold values that define a plurality of electrical signal ranges each of which corresponds to a different one of the exposure ranges; and circuit means coupled to receive the electrical signal and responsive to the electrical signal's value relative to the threshold values for selectively energizing the illuminative elements so that they display the visual indication, the circuit means including a first circuit having a plurality of output terminals, each of a first plurality of the output terminals being connected to a different one of the elements, the first circuit operating to connect on a one-at-a-time basis any one of the elements into a current flow path, and the circuit means further including switching means in the current flow path and controllable by the first circuit either to maintain a steady current flow or to cause pulsating current flow and thereby cause either continuous or flickering illumination of the selected element.

2. A device according to claim 1, wherein the switching means comprises a pair of transistors which are connected in parallel circuit relationship with respect to each other and that are connected in series circuit relationship with respect to the first circuit, an oscillator for driving one of the pair of transistors on and off, the other of the pair of transistors being turned on or off by the first circuit in accordance with the relative value of the electrical signal.

3. A device according to claim 1, wherein the switching means comprises a resistor and a transistor that are connected in parallel circuit relationship with respect to each other and that are connected in series circuit relationship with respect to the first circuit, an oscillator circuit for controlling the transistor, and means responsive to the first circuit for turning the oscillator circuit on or off so that current in the current flow path either flows steadily unaffected by the transistor or pulses at the cyclical rate of turning on and off of the transistor.

4. An exposure meter device for indication of regulated exposure amount, which comprises a plurality of electrically energizable illuminative elements, photometric and circuit means adapted to illuminate on a one-at-a-time basis any selected one of the elements, the circuit means including a circuit having a plurality of output terminals, the elements being arranged in parallel and each being connected to a different one of the output terminals, and a relaxation oscillator, wherein the selected element may be steadily illuminated when a regulated exposure amount is excessive or deficient relative to an optimum exposure within a range defined by a predetermined value and may be caused to flicker by placing energization of the element under control of the relaxation oscillator.

* * * * *